Patented Jan. 10, 1939

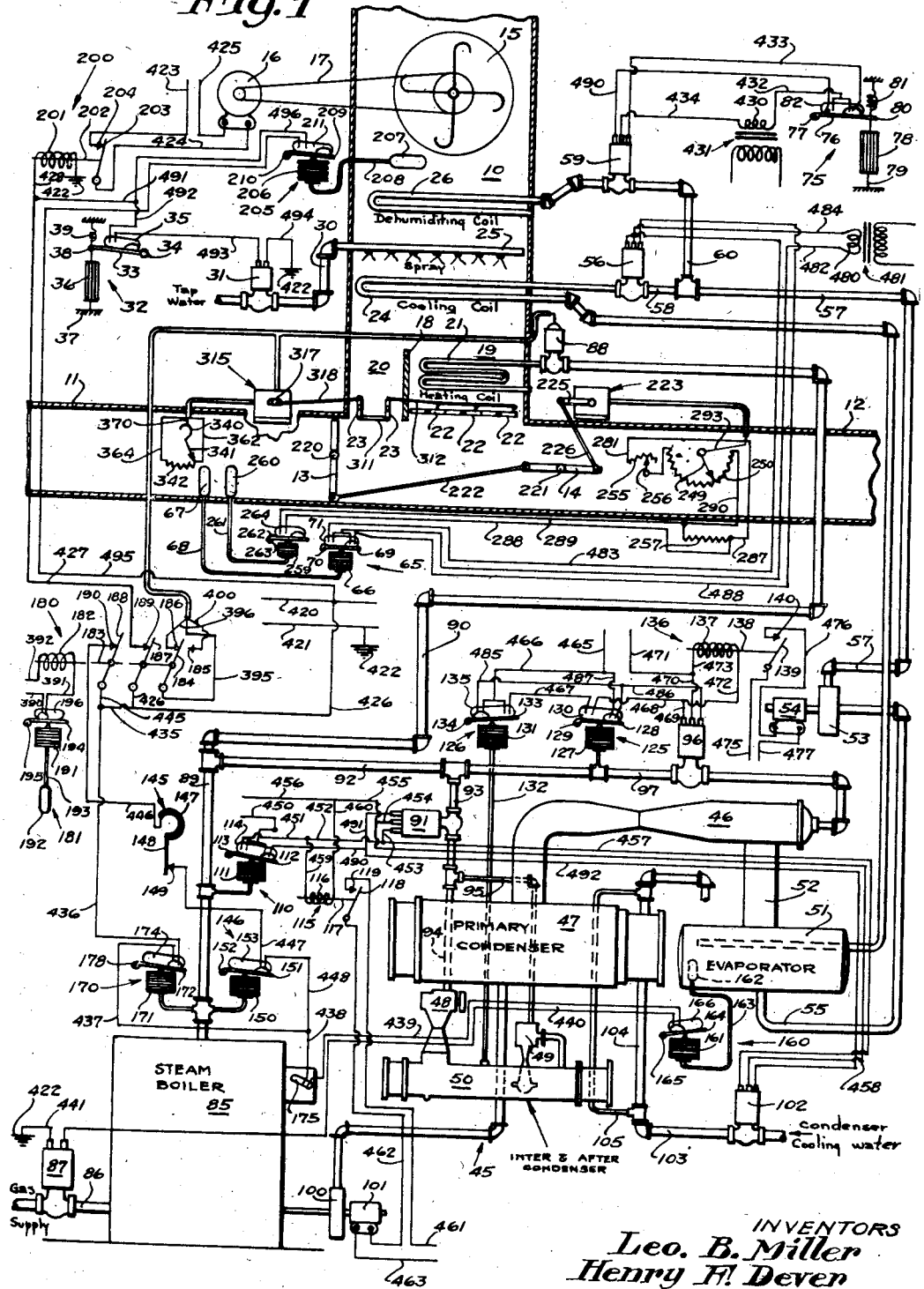

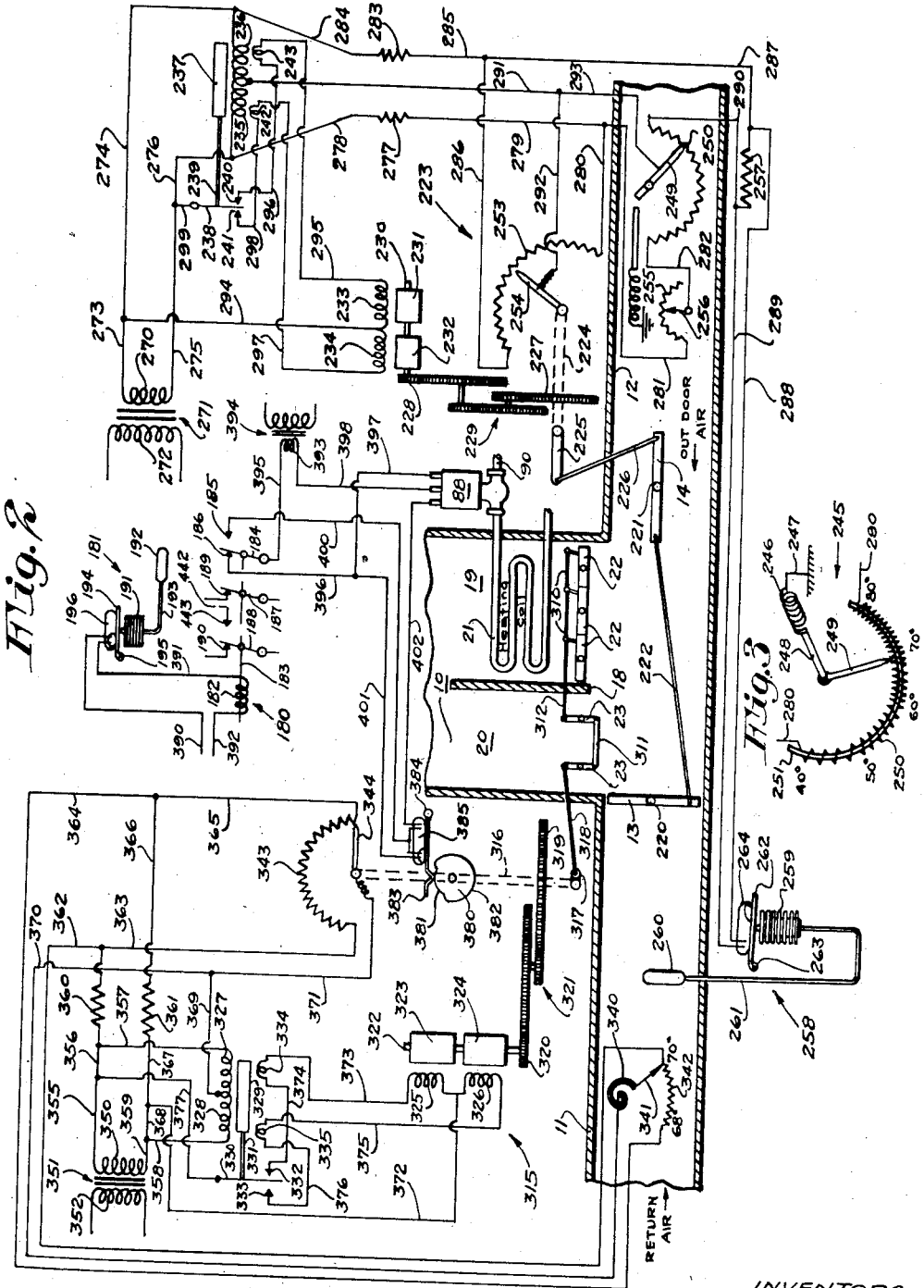

2,143,356

UNITED STATES PATENT OFFICE 2,143,356

AUTOMATIC AIR CONDITIONING SYSTEM

Leo B. Miller and Henry F. Dever, Minneapolis, Minn., assignors to Minneapolis-Honeywell Regulator Company, Minneapolis, Minn., a corporation of Delaware Application September 10, 1934, Serial No. 743,408

15 Claims. (Cl. 236—1)

The present invention relates to air conditioning systems by which the conditions of the air in the space to be controlled, such as the temperature and relative humidity, may be maintained at desired values or within desired limits or a desired limit, irrespective of the condition of the outdoor air.

One of the objects of the invention is the provision of a circulation controlling system by which the flow of outdoor air to a space to be controlled is reduced from a maximum or desired large flow at one outdoor temperature to a minimum flow upon a predetermined change in outdoor temperature, the minimum flow thereafter being maintained irrespective of further outdoor temperature changes in the same direction, the flow of outdoor air to the space being additionally controlled by a space temperature responsive thermostat arranged to reduce the outdoor air flow to the space when the space temperature reaches an undesired value by reason of changes in the outdoor temperature. The arrangement is preferably such that the space temperature responsive thermostat operates to prevent the flow of outdoor air to the space when the outdoor temperature is such as to require a minimum flow of outdoor air to the space and the space temperature, as a result of such abnormal outdoor temperature, also becomes abnormal. This phase of the invention is particularly useful in connection with summer cooling wherein it is desirable to provide the space to be controlled with some fresh outdoor air at all times, the space thermostat completely preventing the taking in of any outdoor air only when the outdoor temperature becomes so excessive as to raise the indoor temperature unduly.

A further object of the invention is the provision of an outdoor air flow control mechanism of the class above described in combination with temperature changing means arranged to change the temperature of the space in an effort to maintain the same constant or within desired limits and preferably under the control of a space temperature responsive thermostat.

A further object of the invention is the provision of means for automatically and selectively heating or cooling a space dependent upon the demands. The demands are preferably measured by changes in outdoor temperature, and, in order to avoid hunting, the arrangement preferred is one wherein there is an appreciable differential between the outdoor temperature at which the system is placed on a heating cycle or a cooling cycle.

Another object of the invention is the provision of an improved heating and cooling system in which both heating and cooling is accomplished by the use of steam, the steam preferably being furnished by a single boiler.

Another object of the invention is the provision of an improved control system for a steam jet or ejector type cooling unit, and particularly one of the types employing a plurality of stages or ejectors.

Other objects of the invention include the provision of an improved control system by which the temperature and relative humidity of a space is controlled regardless of the outdoor temperature conditions and also include the various mechanisms set forth above both singly and in combination.

Other objects of the invention will be found in the detailed description, the appended claims, and the drawings.

For a more complete understanding of the invention, reference may be had to the following description and the accompanying drawings, in which:

Fig. 1 is a diagrammatic showing of the complete system;

Fig. 2 is a diagrammatic showing of the control mechanism for the mixing dampers and the face and by-pass dampers and part of the control of the heating coil valve; and Fig. 3 is a schematic showing of the details of one of the control devices utilized in controlling the mixing dampers.

Referring first to Fig. 1 of the drawings, the system of the present invention includes an air conditioner herein shown as comprising an air conditioning chamber 10 that discharges into the room or space to be conditioned. The air conditioner 10 also communicates with the space by means of a return duct 11 and communicates with the outdoors by an outdoor or fresh-air duct 12. The proportions of return air and outdoor air supplied to the conditioning chamber 10 are determined by mixing dampers 13 and 14 which are controlled in a manner that will be hereinafter described in detail. A fan or blower 15, which is driven by an electric motor 16 through suitable means such as a belt 17, causes air to be circulated through the air conditioning chamber 10 and discharged into the room or space to be conditioned. The air conditioning chamber 10 is provided with a partition 18 which divides the entrance portion of the air conditioning chamber 10 into a heating chamber 19 and a by-pass chamber 20. A heating coil 21 is located in the heating chamber 19. The proportionate flow of air through the heating chamber 19 and by-pass chamber 20 is controlled by face dampers 22 and by-pass dampers 23 which are likewise controlled in a manner that will be described in detail hereinafter. The air conditioning chamber 10 is also provided with a cooling coil 24, a water spray 25, and a dehumidifying coil 26.

Water from any desired source, such as city or tap water, is supplied to the spray 25 by means of a pipe 30, the flow of water through which is controlled by an electrically operated valve 31. This valve 31 is controlled, among other things, by a relative humidity responsive device generally indicated at 32. This relative humidity responsive device 32 includes an arm 33 which is pivoted at 34 and carries a mercury switch of ordinary construction indicated at 35. The arm 34 is actuated by a humidity responsive element 36 that is herein shown as comprising a plurality of strands of hair having one of their ends secured as at 37, whereas their other ends are attached to the lever 33 as indicated at 38. A coiled tension spring 39 operates to place the hair element 36 under the proper stress. The arrangement is such that if the relative humidity decreases to some predetermined value, say thirty-five to forty per cent, the hair element 36 will shrink sufficiently to move arm 33, and therefore mercury switch 35, to positions opposite that shown in Fig. 1 wherein the circuit through mercury switch 35 will be closed.

Cold or chilled water is supplied to the cooling and dehumidifying coils 24 and 26 by means of a steam jet ejector generally indicated at 45. This steam jet ejector includes a primary ejector 46 which communicates with a primary condenser 47, and likewise includes secondary ejectors 48 and 49 which communicate with an inter and after condenser 50. An evaporator 51 which contains the water to be chilled communicates with the primary ejector 46 by pipe means shown at 52. The evaporator 51 is also connected to a circulator 53, that includes an electric motor 54, by means of a pipe 55. The circulator 53 is in turn connected to the cooling coil 24 through an electrically operated valve 56 by means of pipes 57 and 58 and is connected to the dehumidifying coil 26 through an electrically operated valve 59 by means of pipes 57 and 60.

The cooling coil valve 56 is controlled by a temperature controller generally indicated at 65 which includes a bellows 66 that communicates with a control bulb 67 by means of a tube 68, it being understood that the bellows, tube, and bulb are charged with a proper amount of suitable volatile fluid, as is well-known in the art. The bellows 66 operates a lever 69 that is pivoted at 70 and carries a double circuit mercury switch 71. This temperature controller 65 responds to the temperature of the room or space to be controlled, and its bulb 67 is herein shown as being located in the return air duct 11. The setting of this temperature controller is preferably such that its hot contacts or electrodes are bridged by the mercury in mercury switch 71 when the room or space temperature is approximately 75° F., whereas its cold contacts or electrodes are bridged when the room or space temperature is 70° F. Such temperature controllers having appreciable differentials are well-known. The temperature controller 65 is shown in its cold position.

The dehumidifying coil valve 59 is controlled by a relative humidity responsive device generally indicated at 75. This device includes an arm 76 which is pivoted at 77. The actuating element of the relative humidity responsive device 75 is indicated at 78 and is also shown as comprising a plurality of strands of hair. One end of this element 78 is secured as at 79, whereas its other end is attached to arm 76 as indicated at 80. A coiled tension spring 81 serves to place the element 78 under the proper stress. The arm 76 supports a double circuit mercury switch 82, the left-hand or opening electrodes of which are bridged by the mercury when the relative humidity of the space or room rises to some excessive value, such as sixty per cent, whereas the right-hand or closing electrodes thereof are bridged by the mercury at some lesser value of relative humidity.

Steam is supplied to the heating coil 21 and to the steam operated cooling means 45 by a steam boiler 85 which is shown as fired by a gas burner (not shown) that is supplied by gas through a pipe 86. The flow of gas through gas pipe 86 is controlled by an electrically operable gas valve 87. This boiler 85 supplies steam during cold weather to heating coil 21 through a heating coil valve 88 by means of pipes 89 and 90. This steam, after flowing through the heating coil 21, is returned to the boiler 85 in any of the usual manners. The boiler 85 further supplies steam to the secondary ejectors 48 and 49 during warm weather through an electrically operable valve 91 by means of pipes 89, 92, 93, 94, and 95. Steam is likewise supplied to the primary ejector 46 by the boiler 85 during warm weather through an electrically operable valve 96 by means of pipes 89, 92, and 97.

The condensate from the primary condenser 47 is returned to the boiler 85 by a circulator 100 that is driven by an electric motor 101. Condenser water is supplied to the primary condenser 47 and to the inter and after condenser 50 through a condenser water valve 102 by means of pipes 103, 104, and 105. This condenser water can be obtained in any of the usual manners, such as from the city water supply, a cooling tower, etc.

The secondary ejector valve 91, the condensate motor 101, and the condenser valve 102 are controlled by a pressure switch generally indicated at 110. This pressure switch 110 includes a bellows 111 which is connected to the pipe 89. The bellows 111 operates an arm 112 which is pivoted at 113 and carries a double circuit mercury switch 114. The mercury switch 114 is provided with high pressure contacts in its left-hand end and with low pressure contacts in its right-hand end. The arrangement is such that the high pressure contacts close when the boiler pressure reaches nine pounds, and the low pressure contacts close when the boiler pressure falls to seven pounds. The secondary ejector valve 91 and the condenser water valve 102 are directly controlled by the pressure switch 110, whereas the condensate motor 101 is controlled indirectly by the pressure switch 110 through a relay 115. This relay 115 includes a relay coil 116 which, when energized, attracts an armature 117 that moves a switch arm 118 into engagement with a contact 119.

The primary ejector valve 96 is controlled by the conjoint action of a pressure switch 125 and a vacuum switch 126. The pressure switch 125 includes a bellows 127 that responds to boiler pressure and is herein shown as connected to the pipe 97. The bellows 127 operates an arm 128 which is pivoted at 129 and carries a double circuit mercury switch 130. The arrangement is such that the high pressure contacts of the mercury switch 130 are closed when the boiler pressure rises to twelve pounds, and the low pressure contacts are closed when the boiler pressure falls to eleven pounds. The vacuum switch 126 includes a bellows 131 that responds to the vacuum in the cooling unit and is herein shown as connected to the inter and after condenser 56 by means of a pipe 132. The bellows 131 operates an arm 133 which is pivoted at 134 and carries a double circuit mercury switch 135. The arrangement is such that the low pressure or high vacuum contacts in the right-hand end of the mercury switch 135 are closed when the vacuum in the inter and after condenser falls to sixteen inches of mercury. The pressure switch 125 and vacuum switch 126 also control the chilled water motor 54 through a relay 136 that includes a relay coil 137 which, when energized, attracts an armature 138 that in turn moves a switch arm 139 into engagement with a contact 140.

During warm weather, the gas valve 87 is controlled by a room thermostat 145 and a pressure switch 146. The room thermostat 145 includes a suitable temperature responsive element 147, herein shown as comprised of bimetal, that operates a contact arm 148 which is adapted to engage a contact 149. The arrangement is such that contact arm 148 engages contact 149 when the room or space temperature rises to some undesired high value, say 75° F., and disengages contact 149 at some slightly lower temperature. The pressure switch 146 includes a bellows 150 which responds to the pressure in boiler 85 and is shown as connected to pipe 89. Bellows 150 operates an arm 151 which is pivoted at 152 and carries a mercury switch 153. The arrangement is such that mercury switch 153 is opened when the boiler pressure rises to fourteen pounds and returns to closed position when the boiler pressure falls to twelve pounds. During warm weather, the gas valve 87 is additionally controlled by a temperature controller 160 which includes a bellows 161 that is connected to a bulb 162 by a tube 163. The bulb 162 responds to the temperature of the chilled water in the evaporator 51. The bulb 162, bellows 161, and connecting tube 163 are charged with the proper amount of suitable volatile fluid, as is usual in the art. The bellows 161 operates an arm 164 which is pivoted at 165 and carries a mercury switch 166. The arrangement is such that mercury switch 166 is normally closed, but opens if the temperature of the chilled water in the evaporator 51 falls to some undesired low value, say 35° F.

The gas valve 87 is controlled during cold weather by a pressure switch 170 that includes a bellows 171 which responds to the pressure in boiler 85 and is shown as connected to the pipe 89. The bellows 171 operates an arm 172 which is pivoted at 173 and carries a mercury switch 174. The pressure switch 170 is arranged to move mercury switch 174 thereof to closed position whenever the boiler pressure falls to two pounds, the switch being open for all higher values of the boiler pressure. The gas valve 87 is additionally controlled both in warm and cold weather by means of a boiler water level responsive switch 175 which moves to open position whenever the water level in boiler 85 becomes too low.

The system of the present invention includes an automatic change-over mechanism by means of which the system is controlled to provide a cooling function or a heating function depending upon the demands, which demands are measured by outdoor temperature in the specific embodiment of the invention herein disclosed. This change-over mechanism includes a relay 180 and a temperature controller 181. The relay 180 includes a relay coil 182 which attracts an armature 183 when energized. When the relay coil 182 is energized, armature 183 moves a switch arm 184 from engagement with a contact 185 and into engagement with a contact 186. Similarly, switch arms 187 and 188 are moved into engagement with contacts 189 and 190 upon energization of relay coil 182. The temperature controller 181 includes a bellows 191 that is connected to a controlling bulb 192 by means of a tube 193, the bellows, bulb, and tube being charged with a proper amount of suitable volatile fluid. The bellows 191 operates an arm 194 which is pivoted at 195 and carries a mercury switch 196. The bulb 192 responds to outdoor temperature, and the arrangement is such that mercury switch 196 is moved to closed position to energize relay coil 182 whenever the outdoor temperature rises to some high value, such as 75° F. and remains in closed position until the outside temperature falls to some low value, such as 70° F.

The blower motor 16 is controlled by a relay 200 that includes a relay coil 201 which, when energized, attracts an armature 202 and moves a switch arm 203 into engagement with a contact 204. During certain phases of the operation of the system, the relay 200 is controlled in part by a temperature controller 205 which includes a bellows 206 that is connected to a controlling bulb 207 by means of a tube 208, the bellows, bulb, and tube being properly charged with fluid. The bellows 206 operates an arm 209 which is pivoted at 210 and carries a mercury switch 211. The temperature controller 205 responds to the temperature of the conditioned air being delivered to the room or space, and its bulb 205 is herein shown as being located in the path of the air leaving the air conditioning chamber 10. The arrangement is such that mercury switch 211 moves to open position whenever the temperature of the conditioned air falls below some desired minimum value, such as 75° F.

Turning now to Figs. 2 and 3 of the drawings, the mechanism by which the mixing dampers 13 and 14, the by-pass dampers 23, and the face dampers 22, as well as the heating coil valve 88 are controlled will be explained in detail.

The mixing dampers 13 and 14 are respectively located in the return air duct 11 and the outdoor or fresh air duct 12, being respectively pivoted at 220 and 221. These mixing dampers 13 and 14 are inter-connected by means of a tie-bar 222. The mixing dampers 13 and 14 are operated by a motor mechanism generally indicated at 223 which includes a main operating shaft 224 that is provided with a crank 225 which is connected to the damper 14 by means of a tie-bar 226. A gear 227, which is secured to main operating shaft 224, is connected to a motor pinion 228 through suitable reduction gearing 229. The motor pinion 228 is secured to a rotor shaft 230 which also carries a pair of armatures or rotors 231 and 232. Associated with armatures 231 and 232 are energizing or field windings 233 and 234.

Energization of the field windings 233 and 234 is controlled by a balanced relay which includes a pair of similar relay coils 235 and 236 that cooperate to position a single plunger or armature 237. Armature 237 is connected to a switch arm 238 by a non-magnetic and non-conducting connecting member 239. The switch arm 238 cooperates with a pair of spaced contacts 240 and 241. The position of plunger 237 is additionally controlled, under certain conditions, by a pair of similar auxiliary relay windings 242 and 243.

The position of plunger 237 is primarily controlled by a resistance type of outdoor thermostat which is generally indicated at 245 (see Fig. 3). This outdoor resistance type or potentiometer thermostat includes a helically coiled thermal element 246 which may be of the usual bimetallic construction. One end of the thermal element 246 is fixed, either permanently or adjustably, at 247, and its other end operates a torsion rod 248 which in turn carries a contact arm 249. The contact arm 249 cooperates with a resistance 250 which is coiled about a suitable support 251. This resistance 250 is wound upon the support 251 in a graduated or tapered manner so that its electrical effective center is located substantially at the position of contact arm 249 as shown in Fig. 3. The thermal element 246 is preferably exposed to the outdoor temperature by placing the same in the outdoor or fresh-air duct 12, and the adjustment is such that the contact arm 249 engages the effective center of the resistance 250, as shown in Fig. 3, when the outdoor or temperature is 70° F. If the outdoor temperature rises to 80° F., then contact arm 249 moves to the extreme right-hand end of resistance 250. When the outdoor temperature falls to 60° F., then contact arm 249 moves to the geometric center of resistance 250, and at 50° F. the contact arm 249 moves to a position substantially midway between the geometric center of resistance 250 and the extreme left-hand end thereof, whereas if the outdoor temperature falls to 40° F., the contact arm 249 engages the extreme left-hand end of resistance 250.

The energization of relay coils 235 and 236 is also controlled, or rebalanced, by means of a balancing potentiometer including a resistance winding 253 which is adapted to be traversed by a contact arm 254 that is operated by the main operating shaft 224. A rheostat including a resistance 255 and a manually adjustable contact arm 256 is preferably associated with the outdoor resistance 250 for a purpose to be hereinafter set out. Associated with the outdoor resistance 250 is also a resistance 257. The resistance 257 is adapted to be short-circuited by a temperature controller 258. This temperature controller 258 includes a bellows 259 which is connected to a controlling bulb 260 by means of a tube 261, the bellows, bulb, and tube being charged with the volatile fluid. The bellows 259 operates an arm 262 which is pivoted at 263 and carries a mercury switch 264. This temperature controller 248 responds to the temperature of the room or space being controlled, and its bulb 260 may be conveniently located in the return air duct 11. The arrangement is such that the mercury switch 264 is moved to closed position when the room or space temperature rises to some undesired high value, such as 85° F., and is open for all temperatures therebelow.

Low voltage electrical power is supplied to the various relay coils and field windings by means of the low voltage secondary 270 of a step-down transformer 271 having a high voltage primary 272 which is connected to suitable line wires. The relay coils 235 and 236, in series, are connected across the secondary 270 by means of wires 273, 274, 275, and 276. The outer end of relay coil 235 is connected to one end of balancing resistance 253 and to the rheostat resistance 255 through a protective resistance 277 by means of wires 278, 279, 280, and 281. The contact arm 256 of the rheostat is connected to the left-hand end of control resistance 250 by a wire 282. The outer end of relay coil 236 is connected to the other end of balancing resistance 253 and to one end of resistance 257, through a similar protective resistance 283, by means of wires 284, 285, 286, and 287. This same end of resistance 257 is connected to one of the electrodes of mercury switch 264 of temperature controller 258 by means of a wire 288. The other end of resistance 257 is connected to the other electrode of mercury switch 264 by a wire 289 and is connected to the right-hand end of control resistance 250 by a wire 290. The junction of relay coils 235 and 236, the balancing contact arm 254, and the control contact arm 249 are interconnected by wires 291, 292, and 293. One end of each of the field windings 233 and 234 is connected to one side of secondary 270 by wires 273 and 294. The other end of field winding 233 is connected to contact 240 through auxiliary relay winding 243 by means of wires 295 and 296. Similarly, the other end of field winding 234 is connected to contact 241 through auxiliary relay winding 242 by means of wires 297 and 298. The relay switch arm 238 is connected to the other side of secondary 270 by wires 275 and 299.

The face dampers 22 are inter-connected by means of tie-bars 310, and by-pass dampers 23 are inter-connected by means of a tie-bar 311. One of the face dampers 22 is connected to one of the by-pass dampers 23 by a tie-bar 312 so that all of the face and by-pass dampers are operated in unison. The face and by-pass dampers are adapted to be operated by a motor mechanism generally indicated at 315. This motor mechanism includes a main operating shaft 316 that is provided with a crank 317 which is connected to one of the by-pass dampers 23 by a tie-bar 318. A gear 319 which is secured to the main operating shaft 316 is connected to a motor pinion 320 through suitable reduction gearing 321. Motor pinion 320 is secured to a rotor shaft 322 which carries a pair of armatures or rotors 323 and 324. A pair of energizing or field windings 325 and 326 are associated with the rotors 323 and 324. Energization of the field windings 325 and 326 is controlled by a balanced relay mechanism that includes a pair of similar relay coils 327 and 328 which cooperate in the positioning of a plunger or armature 329. The plunger or armature 329 positions a relay switch arm 330 through the medium of a non-magnetic and non-conducting connection 331, the relay switch arm 330 in turn cooperating with a pair of spaced contacts 332 and 333. The position of plunger or armature 329 is additionally controlled by a pair of similar auxiliary relay windings 334 and 335. The energizations of relay windings 327 and 328 are controlled by a temperature controller in the form of a potentiometer thermostat which includes a thermal actuator 340, herein shown as a coiled bimetallic strip, that positions a control contact arm 341 which in turn cooperates with a control resistance 342. The control resistance 342 is evenly wound about a suitable support (not shown). This potentiometer thermostat responds to the room or space temperature and may be conveniently located in the return air duct 11 as shown. The calibration is such that the control contact arm 341 engages the extreme right-hand end of control resistance 342 when the room or space temperature is 70° F. and engages the extreme left-hand end of this control resistance when the room or space temperature falls to 68° F., these limits, of course, being merely exemplary. The energizations of relay windings 327 and 328 are adapted to be balanced by a balancing potentiometer which includes a balancing resistance 343 and a balancing contact arm 344 cooperable therewith which is secured to the main operating shaft 316.

Low voltage electrical power is supplied to the motor mechanism 315 by means of the low voltage secondary 350 of a step-down transformer 351 having a high voltage primary 352 that is connected to suitable line wires. The relay coils 327 and 328, in series, are connected across the secondary 350 by means of wires 355, 356, 357, 358, and 359. The control resistance 342 and the balancing resistance 343 are connected in parallel across the secondary 350 through similar protective resistances 360 and 361 by means of wires 355, 356, 362, 363, 364, 365, 366, 367, 368, and 359. The junction of relay coils 327 and 328 the control contact arm 341, and the balancing contact arm 344 are interconnected by means of wires 369, 370, and 371. One end of each of the field windings 325 and 326 is connected to one side of secondary 350 by means of wires 359, 368, and 372. The other end of field winding 325 is connected to contact 332 through auxiliary relay winding 334 by means of wires 373 and 374. Likewise, the other end of field winding 326 is connected to contact 333 through auxiliary relay winding 335 by means of wires 375 and 376. The relay switch arm 330 is connected to the other side of secondary 350 by means of wires 355 and 377.

The main operating shaft 316 of motor mechanism 315 carries a cam 380 which is provided with a closing portion 381 and an opening portion 382. A cam follower 383 which is pivoted at 384 cooperates with the closing and opening portions of cam 380 and carries a mercury switch 385 which is provided with closing and opening electrodes for cooperating in the control of the heating coil valve 88 in a manner to be subsequently explained.

*Operation of the face and by-pass dampers and the heating coil valve*

Referring to Fig. 2 of the drawings, the outdoor temperature has been at or above 75° F. but has dropped to substantially 70° F. so that the mercury switch 196 of the change-over thermostat 181 is in closed circuit position. Relay coil 182 of the change-over relay 180 is therefore energized as follows: line 390, mercury switch 196, wire 391, relay coil 182, and line 392. Switch arms 184, 187, and 188 are therefore engaged with their respective contacts 186, 189, and 190, and switch arm 184 is disengaged from contact 185.

The indoor temperature is likewise about 70° F. or slightly thereabove so that control contact arm 341 is engaged with the extreme right-hand end of control resistance 342, and balancing contact finger is engaging the extreme right-hand end of balancing resistance 343. Relay coil 327 is therefore substantially short-circuited by a circuit which is as follows: relay coil 327, wire 369, wire 370, thermal element 340, control contact arm 341, wire 362, protective resistance 360, and wire 367 to the other side of relay 327. Likewise, with the parts in the position shown, relay coil 328 is substantially short-circuited by a circuit as follows: relay coil 328, wire 369, wire 371, balancing contact arm 344, wire 365, wire 366, protective resistance 361, wire 367, wire 368, and wire 358 to the other side of relay coil 328. The inclusion of protective resistances 360 and 361 prevents the complete short circuiting of relay coils 327 and 328 when the control contact finger 341 and the balancing contact 344 are in the extreme positions shown or in the opposite extreme positions. Relay coils 327 and 328 are therefore equally energized, and the plunger 329 assumes the central position shown, wherein relay switch arm 330 is intermediate contacts 332 and 333. Field windings 325 and 326 are therefore both deenergized so that rotor shaft 322 and main actuating shaft 316 are stationary. The by-pass dampers 23 are both open, and the face dampers 22 are all closed, thereby requiring that all air flowing into the air conditioning chamber 10 must pass through the by-pass chamber 20.

Cam follower 383 is engaged with the closing portion 381 of the cam 380 so that mercury switch 385 has its closing electrodes or left-hand electrodes closed. Heating coil valve 88 is closed, however, irrespective of the condition of mercury switch 385 by a circuit as follows: secondary 393 of a transformer 394, wire 395, switch arm 184 and contact 186 of change-over relay 180, wire 396, wire 397, heating coil valve 88, and wire 398 to the other side of secondary 393. As a result, no steam can flow to the heating coil 21.

As long as the outdoor temperature does not fall below 70° F., the room or space temperature will also remain at or above 70° F. so that control contact arm 341 will remain in engagement with the extreme right-hand end of control resistance 342, and the face and by-pass dampers will remain in the positions shown. Now if the outdoor temperature falls slightly, mercury switch 196 of the change-over temperature controller 181 will move to open position, and the above described energizing circuit for relay coil 182 of the change-over relay 180 will be interrupted. Switch arms 184, 187, and 188 will therefore move from engagement with contacts 186, 189, and 190, and switch arm 184 will move into engagement with contact 185. When this outdoor temperature drop first takes place, the indoor temperature probably will not fall for at least a short time so the motor mechanism 315 will remain in the position shown. Movement of switch arm 184 into engagement with contact 185 does not open the heating coil valve 88 but, in fact, places the control of this valve upon the mercury switch 385. As long as mercury switch 385 remains in the position shown, there will be a closing circuit for the heating coil valve 88 which is as follows: secondary 393 of transformer 394, wire 395, switch arm 184, contact 185, wire 400, closing contacts of the mercury switch 385, wire 401, wire 397, valve 88, and wire 398 to the other side of secondary 393.

Now if the room or space temperature falls somewhat, control contact arm 341 will move along control resistance 342 toward the left-hand end thereof, whereupon the voltage drop across relay coil 327 will be increased. Plunger 329 will therefore move to the right and bring relay switch arm 330 into engagement with contact 332, whereupon a series circuit through auxiliary relay coil 334 and field winding 325 will be established as follows: secondary 350 of transformer 351, wire 355, wire 377, relay switch arm 330, contact 332, wire 374, auxiliary relay winding 334, wire 373, field winding 325, wire 372, wire 368, and wire 359 to the other side of secondary 350. Energization of auxiliary relay winding 334 causes an additional pull to be exerted upon plunger 329 tending to move the same toward the right, whereupon the original light contact pressure between relay switch arm 330 and contact 332 will be increased whereby to assure a good firm contact therebetween. Energization of field winding 325 causes rotation of rotor 323 in a counter-clockwise direction, looking upwardly, whereupon main actuating shaft 316 will be rotated in the same direction. Balancing contact finger 344 therefore moves slowly along balancing resistance 343 toward the left-hand end thereof until the voltage drop across relay coil 328 is made slightly larger than the voltage drop across relay coil 327 and returns plunger 329 to its central position, moving relay switch arm 330 from engagement with contact 332, whereupon field winding 325 is deenergized. During this time, crank 317 is rotated a small amount in counter-clockwise direction, whereupon by-pass dampers 23 revolve a small amount in the same direction so as to partially close off by-pass passage 20. Similarly, the face dampers 22 are rotated a small amount in counter-clockwise direction, whereby the passage of a small amount of air through the heating chamber 19 is permitted. Also, a relatively small counter-clockwise rotation of cam 380 takes place and causes its opening portion 382 to lift the cam follower 383, whereupon the opening or right-hand electrodes of mercury switch 385 are closed to establish an opening circuit for heating coil valve 88 which is as follows: secondary 393 of transformer 394, wire 395, switch arm 184, contact 185, wire 400, the opening electrodes of mercury switch 385, wire 402, heating coil valve 88, and wire 398 to the other side of secondary 393. Opening of the heating coil valve 88 permits the passage of steam to the heating coil 21 so that the small amount of air passing through the heating chamber 19 is raised in temperature before being delivered to the room or space to be heated.

As it becomes colder outdoors, or if for any other reason the room or space temperature should drop further, control contact arm 341 moves further along control resistance 342 toward its left-hand end with the result that field winding 325 is again energized, and main actuating shaft 316 is moved further in counter-clockwise direction. If the room or space temperature drops to 68° F., the control contact arm 341 will engage the extreme left-hand end of control resistance 342, whereupon relay coil 328 is substantially short-circuited by the following circuit: relay coil 328, wire 369, wire 370, thermal element 340, control contact arm 341, wire 364, wire 366, protective resistance 361, wire 367, wire 368, and wire 358 to the other side of relay coil 328. Main actuating shaft 316 will therefore be rotated in counter-clockwise direction until balancing contact finger 344 moves to the extreme left-hand end of balancing resistance 343, whereupon relay coil 327 will be substantially short-circuited as follows: relay coil 327, wire 369, wire 371, balancing contact arm 344, wire 363, protective resistance 360, and wire 357 to the other side of relay coil 327. Plunger 329 will therefore assume its central position as shown in Fig. 2 of the drawings, but control contact arm 341 and balancing contact arm 344 will be in their opposite extreme positions. As a result, crank 317 will have been moved through a complete half revolution, whereby the by-pass dampers 23 will be completely closed to prevent the flow of any air whatsoever through the by-pass chamber 20, and the face dampers 22 will be completely opened to permit all of the air passing to the air conditioning chamber 10 to pass through the heating chamber 19 and over the heating coil 21. At this time, the cam follower 383 will still be engaged with the opening portion 382 of the cam 380.

Whenever the room temperature rises, control contact arm 341 will move along control resistance 342 toward the right-hand end thereof, whereupon the voltage drop across relay coil 328 will become sufficiently greater than the voltage drop across relay coil 327 to cause plunger 329 to move sufficiently toward the left to bring relay switch arm 330 into engagement with contact 333. This establishes a series circuit through the auxiliary relay winding 335 and the field winding 326 which is as follows: secondary 350, wire 355, wire 377, relay switch arm 330, contact 333, wire 376, auxiliary relay winding 335, wire 375, field winding 326, wire 372, wire 368, and wire 359 to the other side of secondary 350. Energization of auxiliary relay winding 335 exerts an additional pull on plunger 329 toward the left, whereby relay switch arm 330 is brought into firm engagement with contact 333. Energization of field winding 326 causes rotation of motor rotor 324 in a clockwise direction, looking upwardly, whereupon main actuating shaft 316 is likewise rotated in a clockwise direction. Balancing contact arm 344 therefore moves along balancing resistance 343 toward the right-hand end thereof until the voltage drop across relay winding 327 is made sufficiently greater than the voltage drop across relay winding 328 to return the plunger 329 to its central position whereupon field winding 326 is deenergized. During this time, crank 317 is rotated in a clockwise direction partially to open, or open further, the by-pass dampers 23 and partially to close, or close further, the face dampers 22.

In this manner, whenever the system is on summer operation by reason of mercury switch 196 of the change-over temperature controller 181 being closed, the heating coil valve 88 is closed irrespective of the room or space temperature. However, whenever the outdoor temperature is sufficiently low so that the mercury switch 196 is open, the heating coil valve 88 is controlled by the thermal element 340 through the medium of the motor mechanism 315 and mercury switch 385. During this cold weather operation, the thermal member 340, through the medium of the motor mechanism 315, proportions the flow of air through the heating and by-pass chambers 19 and 20. It will be evident that the cam 380 may be arranged to open the heating coil valve 88 for any desired position of the control contact arm 341 when the system is operating under cold weather conditions.

*Operation of the mixing dampers*

Operation of the mixing dampers 13 and 14 is controlled by the potentiometer outdoor temperature controller 245 through motor mechanism 223 in a manner very similar to the manner in which the face and by-pass dampers 22 and 23 are controlled by the indoor potentiometer controller through the motor mechanism 315.

With the parts in the position shown, the outdoor temperature is substantially 70° F. so that control contact arm 249 is engaged with the effective center of the resistance 250. The rheostat contact arm 256 is shown adjusted upon the rheostat resistance 255 so that its effective resistance is equal to the resistance 257. As a result, the control finger 249 is engaged with the effective center of the combined resistances of the rheostat resistance 255, the control resistance 250, and the resistance 257. Balancing contact finger 254 is engaged with the center of balancing resistance 253 whereby the voltage drops across relay coils 235 and 236 are equal, and the plunger 237 is in the central position shown wherein relay switch arm 238 is intermediate the associated contacts 240 and 241. Mixing damper 13 is positioned to close off completely the return air duct 11, it being understood that a small flow of air is allowed therethrough around the edges of the damper 13 so that the controls located in this duct are subjected to air at room or space temperature. The mixing damper 14 is completely opened, thereby allowing a full flow of outdoor or fresh air through the outdoor or fresh-air duct 12 and into the air conditioning chamber 10.

If the outdoor temperature should rise, control contact arm 249 will move along control resistance 250 toward its right-hand end, whereupon the voltage drop across relay coil 235 will be increased, and the voltage drop across relay coil 236 will be decreased. When the outdoor temperature has risen sufficiently, this difference in voltage drops across relay coils 235 and 236 will cause plunger 237 to move toward the left sufficiently to bring relay switch arm 238 into engagement with contact 241. A series energizing circuit for auxiliary relay winding 242 and field winding 234 is thus established as follows: secondary 270 of transformer 271, wire 275, wire 299, relay switch arm 238, contact 241, wire 298, auxiliary relay winding 242, wire 297, field winding 234, wire 294, and wire 273 to the other side of secondary 270. Energization of auxiliary relay winding 242 exerts an additional pull on plunger 237 toward the left, whereby relay switch arm 238 is held in firm engagement with contact 241. Energization of field winding 234 causes a counter-clockwise rotation of rotor shaft 230, as viewed from the left, whereby main actuating shaft 224 is rotated in a clockwise direction also when viewed from the left. Balancing contact finger 254 therefore moves along balancing resistance 253 toward the right-hand end thereof to increase the voltage drop across relay winding 236 and decrease the voltage drop across relay winding 235. When balancing contact arm 254 has moved along balancing resistance 253 toward the right-hand end thereof sufficiently far, the voltage drop across relay winding 236 will become sufficiently greater than that across the relay winding 235 to return plunger 237 to the central position shown in Fig. 2 of the drawings, whereupon field winding 234 is deenergized. This clockwise rotation of main operating shaft 224 causes a clockwise rotation of crank 225, whereupon mixing damper 14 is rotated in a counter-clockwise direction toward its vertical position to close off partially the flow of air from the outdoors and through the outdoor air duct 12. The connecting tie-bar 222 similarly causes a counter-clockwise rotation of mixing damper 13 so that it moves toward the horizontal position thereby permitting more air to flow from the room or space through the return air duct 11 into the air conditioning chamber 10.

As the outdoor temperature continues to increase, further successive movements of the mixing dampers 13 and 14 will take place until the outdoor temperature reaches 80° F. At this time, the relay coil 236 will be substantially short-circuited as follows: relay coil 236, wire 291, wire 293, control contact arm 249, wire 290, resistance 257, wire 287, wire 285, protective resistance 283, and wire 284 to the other side of relay coil 236. The short-circuiting of relay coil 236 is incomplete, not only by reason of the protective resistance 283, but also by reason of the resistance 257. Actuating shaft 224 therefore will not move balancing contact finger 254 to the extreme right-hand end of balancing resistance 253 in rebalancing the voltage drops across relay windings 235 and 236. The mixing damper 14 will therefore be moved to a position less than its vertical position, and the mixing damper 13 will be moved to a position less than its horizontal position. In this manner, by the inclusion of the resistance 257 a minimum supply of outdoor or fresh air is taken into the air conditioning chamber 10 regardless of how high the outdoor temperature becomes. If the outdoor temperature rises to 80° F. or thereabove, however, and, as a result, the space or room temperature rises to 85° F., then the mercury switch 264 of the controller 258 will be moved to closed circuit position whereby resistance 257 is short-circuited. The relay coil 236 will thereupon be entirely short-circuited, except for the protective resistance 283, and the balancing contact finger 254 will move to the extreme right-hand end of balancing resistance 253, whereupon relay winding 236 will be short-circuited, except for the similar protective resistance 277. The mixing damper 14 will therefore be moved to its full vertical position thereby effectively preventing the inflow of any outdoor air except for the small amount which passes around the edges of mixing damper 14 that, incidentally, operates to maintain the thermal element 246 of the outdoor controller 245 subjected to outdoor temperature. Mixing damper 13 will be moved to its full horizontal position so that a complete flow of space or room air will be taken into the air conditioning chamber 10.

Whenever there is a fall in outdoor temperature, control contact arm 249 will move along control resistance 250 toward its left-hand end and thereby increase the voltage drop across relay coil 236. When this increase in voltage drop becomes sufficient, plunger 237 will move far enough toward the right to bring relay switch arm 238 into engagement with contact 240. A series circuit for auxiliary relay winding 243 and field winding 233 is thereupon established as follows: secondary 270, wire 275, wire 299, relay switch arm 238, contact 240, wire 296, auxiliary relay winding 243, wire 295, field winding 233, wire 294, and wire 273 to the other side of secondary 270.

Energization of auxiliary relay winding 243 exerts an additional pull on plunger 237 toward the right, whereby relay switch arm 238 is held firmly against contact 240. Energization of field winding 233 causes rotation of rotor shaft 230 in a clockwise direction as viewed from the left. The main actuating shaft 224 will therefore be rotated in a counter-clockwise direction as viewed from the left, and balancing contact arm will move along balancing resistance 253 toward the left-hand end thereof. This movement will continue until the voltage drop across relay winding 235 has been increased sufficiently over that of relay coil 236 to cause plunger 237 to return to its central position and deenergize field winding 233. During this time, mixing damper 14 is rotated in clockwise direction toward its horizontal position, and mixing damper 13 is rotated in counterclockwise direction toward its vertical position.

When the outdoor temperature has returned to 70° F., the parts will resume the position in which they are shown in Fig. 2 of the drawings. Upon continued outdoor temperature fall, accompanied by continued counter-clockwise rotation of main actuating shaft 224, mixing damper 14 will continue rotating in a clockwise direction and toward its vertical position. Mixing damper 13, after reaching its vertical position, will begin rotating in a counter-clockwise direction toward its horizontal position. When the outdoor temperature falls to 40° F. the relay coil 235 will be short-circuited, except for the protective resistance 277 and the effective portion of rheostat resistance 255. Balancing contact finger 254 will not, therefore, move to the extreme left end of balancing resistance 253 in rebalancing the voltage drops across relay windings 235 and 236. Mixing damper 14, therefore, is not moved to its complete vertical position, nor is mixing damper 13 moved to its complete horizontal position. In this manner, a predetermined minimum supply of outdoor air is furnished to the air conditioning chamber 10, regardless of how low the outdoor temperature falls. The amount of this predetermined minimum outdoor air flow may be adjusted by adjusting the effective portion of rheostat resistance 255.

It will therefore be seen that at normal or intermediate outdoor temperatures, 70° F. in the disclosed arrangement, a full flow of outdoor air is taken into the air conditioning chamber 10, and no air is taken thereinto from the room or space being controlled. Then if the outdoor temperature either rises above or falls below this intermediate value, the amount of outdoor air is decreased, and an increasing amount of room or space air is allowed to pass to the air conditioning chamber 10, but this rate of change per degree change in outdoor temperature is not the same for temperatures above and below 70° F. by reason of the tapered nature of the resistance winding 250. Furthermore, there is provision by which definite predetermined minimum flows of outdoor air are taken into the air conditioning chamber 10 for ventilation purposes, irrespective of how high or how low the outdoor temperature becomes. When the outdoor temperature becomes excessive, however, if the indoor temperature likewise becomes excessive, then this minimum inflow of outdoor air is prevented by operation of the temperature controller 258. The minimum flow of outdoor air taken into the air conditioner during cold weather can be varied by manual adjustment of rheostat arm 255.

It will be noted that the automatic change-over mechanism plays no part whatsoever in the control of the mixing dampers 13 and 14, these mixing dampers being controlled entirely both in cold and warm weather in accordance with changes in outdoor temperature, except for the abnormal control function furnished by the temperature controller 258, whereby the minimum supply of outdoor air during hot weather is eliminated if the room or space temperature becomes excessive.

*Operation of the complete system*

Power is supplied to certain parts of the system by line wires 420 and 421, the latter of which, for convenience of illustration, has been shown as connected to ground 422.

With the parts in the position shown, the outdoor temperature has been at 75° F. or higher, and has fallen to approximately 70° F., so that the mercury switch 196 of the change-over temperature controller 181 is closed, and relay coil 182 is energized by the before described circuit. Since the outdoor temperature is at about 70° F., the mixing dampers 13 and 14 are positioned to allow the admission of a full flow of fresh outdoor air to the air conditioning chamber 10, and the face and by-pass dampers 22 and 23 are positioned to direct this full flow of outdoor air through the by-pass chamber 20, all in the manner heretofore set out. Also, the heating coil valve 8 is closed.

The blower motor 16 is energized whenever relay coil 201 is energized, the blower motor circuit being as follows: line wire 423, contact 204, switch arm 203, wire 424, blower motor 16, and line wire 425. With the wiring arrangement shown, the relay coil 201 is constantly energized when the system is operating on the warm weather cycle. This energizing circuit for relay coil 201 is as follows: line wire 420, wire 426, switch arm 187, contact 198, wire 427, wire 428, relay coil 201, and ground 422. While the blower motor 16 has been shown as constantly energized during the warm weather cycle, it will be appreciated that in some instances it may be desirable to operate the blower motor 16 only when there is a demand for cooling, and, in certain installations, it may be further desirable to prevent the operation of the blower motor 16, as well as certain other of the parts, during the night or other hours when the room or space to be controlled is generally unoccupied.

The relative humidity of the room or space to be controlled is between forty and sixty per cent. Mercury switch 35 of humidity controller 32 is therefore open, and the water valve 31, which controls the flow of water to the spray 25, is de-energized. Also, the closing contacts of mercury switch 82 of the humidity controller 75 are closed, so that a closing circuit for dehumidifying valve 59 is established as follows: secondary 430 of a transformer 431, wire 432, closing contacts of the mercury switch 82, wire 433, dehumidifying coil valve 59, and wire 434 to the other side of secondary 430.

The boiler pressure is less than two pounds, so the mercury switch 174 of two-pound pressure switch 170 is closed. The water level in the boiler is sufficiently high so that the water level responsive switch 175 is also closed, and the temperature of the chilled water in the evaporator 51 is above 35° F. so that the mercury switch 166 of the freeze control 160 is also closed. With the wiring arrangement shown, gas valve 87 is therefore energized as follows: line 420, wire 426, wire 435, wire 436, mercury switch 174, wire 437, wire 438, low water cut-off switch 175, wire 439, freeze control switch 166, wire 440, gas valve 87, and wire 441 to ground 422. The pressure switch 170 will therefore operate to maintain a steam pressure of two pounds in the boiler 85, irrespective of whether the system is operating on the warm or cold weather cycle. In some instances, it may be desired to operate the boiler only to maintain a constant minimum pressure of two pounds during the cold weather cycle, in which event the wire 436 may be omitted and replaced by a wire which is connected to a contact that is adapted to be engaged by switch arm 71

188 when change-over relay coil 182 is deenergized. Under these conditions, the gas valve 87 would not be operated during the warm weather cycle to maintain the minimum boiler pressure of two pounds.

If the outdoor temperature should now rise, the amount of outdoor air delivered to the air conditioning chamber 10 will be decreased by the mixing dampers 13 and 14 in the manner heretofore described. A rise in outdoor temperature will result in a rise in indoor temperature, and when the indoor temperature reaches some undesired high value of say 75° F., the contact arm 148 of the room thermostat 145 will move into engagement with contact 149, whereby gas valve 87 will be energized irrespective of the wiring to the two-pound pressure switch 170. This energizing circuit for the gas valve 87 is as follows: line 420, wire 426, wire 435, wire 445, switch arm 188, contact 190, wire 446, thermal element 147, contact arm 148, contact 149, wire 447, mercury switch 153 of the fourteen-pound pressure switch 146, wire 448, wire 438, low water cut-off switch 175, wire 439, freeze control switch 166, wire 440, gas valve 87, and wire 441 to ground 422. Energization of the gas valve 87 operates to supply heat to the boiler 85, whereupon the steam pressure thereof will be raised.

When the boiler pressure reaches nine pounds, the pressure switch 110 will operate mercury switch 114 to close the high pressure electrodes thereof, whereby opening circuits for secondary ejector valve 91 and condenser water valve 102, as well as an energizing circuit for relay coil 116, are established. The circuit for secondary ejector valve 91 is as follows: line 450, high pressure contacts of mercury switch 114, wire 451, wire 452, wire 453, secondary ejector valve 91, wire 454, and wire 455 to line wire 456. The opening circuit for condenser water valve 102 is as follows: line 450, the high pressure contacts of mercury switch 114, wire 451, wire 452, wire 457, condenser water valve 102, wire 458, wire 455, to line wire 456. The energizing circuit for relay coil 116 is as follows: line 450, the high pressure contacts of mercury switch 114, wire 451, wire 459, relay coil 116, and wire 460 to line 456.

Opening of secondary ejector valve 91 admits steam to the secondary ejectors 48 and 49, and opening of condenser water valve 102 admits cooling water to the primary condenser 47 and inter and after condenser 50. Energization of relay coil 116 energizes condensate pump motor 101 as follows: line 461, contact 119, switch arm 118, wire 462, condensate pump motor 101, and line 463. In this manner, the proper vacuum is drawn in the inter and after condenser, so that the high vacuum or low pressure contacts of the mercury switch 135 of vacuum switch 126 soon close. Continued operation of the boiler causes the steam pressure to rise, and when it reaches twelve pounds, the high pressure contacts of mercury switch 130 of the pressure switch 125 will also close, whereupon an opening circuit for primary ejector valve 96 is established, and an energizing circuit for the relay coil 137 of the chilled water circulating motor relay 136 is closed. This opening circuit for primary ejector valve 96 is as follows: line 465, wire 466, high vacuum or low pressure contacts of mercury switch 135, wire 467, high pressure contacts of mercury switch 130, wire 468, wire 469, primary ejector valve 96, and wire 470 to line wire 471. The energizing circuit for relay coil 137 is as follows: line wire 465, wire 466, high vacuum contacts of mercury switch 135, wire 467, high pressure contacts of mercury switch 130, wire 468, wire 472, relay coil 137, and wire 473 to line wire 471.

Opening of primary ejector valve 96 admits steam to primary ejector 46 whereby the temperature of the water in evaporator 51 is reduced. Energization of relay coil 137 energizes circulating motor 54 as follows: line 475, switch arm 139, contact 140, wire 476, motor 54, and line wire 477.

When the room or space temperature formerly rose to 75° F., the temperature controller 65 operated its mercury switch 71 to close the circuit through its opening contacts or high temperature contacts, whereupon an opening circuit for cooling coil valve 56 was established as follows: secondary 480 of step-down transformer 481, wire 482, high temperature contacts of mercury switch 71, wire 483, cooling coil valve 56, and wire 484 to the other side of secondary 480. As a result, the water in evaporator 51 is chilled and is circulated to the cooling coil 24 by means of circulator 53. The air passing through the conditioning chamber 10 is therefore reduced in temperature in an attempt to restore the room temperature to the desired value. If the boiler pressure should reach fourteen pounds, the pressure switch 146 would open its mercury switch 153 to deenergize the gas valve 87. This mercury switch 153 would again close when the boiler pressure became reduced to twelve pounds. If for any reason the vacuum in the inter and after condenser 50 should become less than the desired sixteen inches of mercury, i. e. if the vacuum should become fourteen inches of mercury for example, the mercury switch 135 of vacuum switch 126 will return to the position shown in Fig. 1 of the drawings to close the lefthand contacts of mercury switch 135 and open the right-hand contacts thereof. This deenergizes relay coil 137, and establishes a closing circuit for primary ejector valve 96. The closing circuit for primary ejector valve 96 is as follows: line 465, wire 485, low vacuum contacts of mercury switch 135, wire 486, wire 469, primary ejector valve 96, wire 470, and line 471. Similarly, if the steam pressure should fall below eleven pounds, the low pressure contacts of mercury switch 130 will be reclosed, as shown in Fig. 1, whereupon the energizing circuit for relay coil 137 will be interrupted, and a closing circuit for primary ejector valve 96 will be established irrespective of the condition of vacuum switch 126. This closing circuit for primary ejector valve 96 is as follows: line 465, wire 487, low pressure contacts of mercury switch 130, wire 488, primary ejector valve 96, wire 470, and line 471.

In this manner, operation of the primary ejector to cool the water in evaporator 51 is prevented whenever the steam pressure becomes too low and whenever there is insufficient vacuum in the inter and after condenser 50.

If the room temperature is thus lowered below 75° F., the mercury switch 71 of temperature controller 65 returns to the position shown wherein its low temperature contacts are closed and establishes a closing circuit for cooling coil valve 56 as follows: secondary 480, wire 482, low temperature contacts of mercury switch 71, wire 488, cooling coil valve 56, and wire 484 to the other side of secondary 480. This lowering of the room temperature also moves contact blade 148 of the temperature controller 145 from engagement with its contact 149, thereby deenergizing gas valve 87. The steam pressure therefore quickly falls below eleven pounds, returning pressure switch 125 to the position shown, whereupon primary ejector valve 96 will be closed by the circuit described above, and the relay coil 137 will be deenergized to interrupt the energizing circuit for circulator motor 54. The steam pressure will continue to drop, and when it reaches seven pounds, the pressure switch 110 will return to the position shown in Fig. 1, whereupon relay coil 116 will be deenergized to interrupt the energizing circuit for condensate motor 101, and closing circuits for secondary ejector valve 91 and condenser water valve 102 will be established. The closing circuit for secondary ejector valve 91 is as follows: line 450, low pressure contacts of mercury switch 114, wire 490, wire 491, secondary ejector valve 91, wire 454, wire 455, and line 456. The closing circuit for condenser water valve 102 is as follows: line 450, low pressure contacts of mercury switch 114, wire 490, wire 492, condenser water valve 102, wire 458, wire 455, and line 456.

If the temperature of the chilled water in the evaporator 51 is reduced to the value of 35° F. during a demand for cooling, the mercury switch 166 of the freeze control 160 will be moved to open position and interrupt the energizing circuit for gas valve 87. As a result, the boiler pressure will soon fall in the manner hereinbefore described so as to prevent further operation of the steam jet ejector until the chilled water temperature rises to a safe value. This freeze control is purely a safety control, and ordinarily is not called upon to operate.

Whenever the relative humidity in the room or space becomes excessive, expansion of the humidity responsive element 78 causes the opening or left-hand electrodes of the mercury switch 82 to be closed, whereupon the dehumidifying coil valve 59 is opened by completion of the following opening circuit therefor: secondary 430 of transformer 431, wire 432, mercury switch 82, wire 490, dehumidifying coil valve 59, and wire 434 to the other side of secondary 430. Opening of the dehumidifying coil valve 59 allows chilled water to flow to the dehumidifying coil 26 in the event the cooling apparatus and the circulator 53 are in operation. It will be noted that water of the same temperature is supplied to the cooling coil 24 and dehumidifying coil 26. While each of these coils will probably operate both to cool and dehumidify to a certain extent, by proper coil design the cooling coil will operate primarily to cool, and the dehumidifying coil will operate primarily as a dehumidifying means.

During the warm weather operation, if the relative humidity should become too low, the humidity responsive element 36 will contract sufficiently to close the circuit through mercury switch 35, whereupon spray water valve 31 is energized as follows: line 420, wire 426, switch arm 187, contact 189, wire 427, wire 491, wire 492, mercury switch 35, wire 493, spray water valve 31, and wire 494 to ground 422. Water is thereby allowed to flow to the spray 25 so as to increase the relative humidity of the air being delivered to the room or space.

If the outdoor temperature becomes excessive, the mixing damper 14 will be moved to its minimum flow position, and if the room temperature becomes excessive so as to close mercury switch 264, then the mixing damper 14 will be completely closed as hereinbefore described.

Whenever the outdoor temperature falls below 70° F., the change-over temperature controller 181 moves its mercury switch 196 to open circuit position, whereupon relay coil 182 of the change-over relay 180 is deenergized. Switch arms 184, 187, and 188 therefore move from engagement with contacts 186, 189, and 190, and switch arm 184 moves into engagement with contact 185. In this manner, the constant energizing circuit for fan motor relay 200 is interrupted, and the heating coil valve 88 is placed under the control of the mercury switch 385 of the motor mechanism 315 as heretofore explained.

The gas valve 87 is then operated under the control of the two-pound pressure switch 170 by one or the other of the circuits hereinbefore pointed out so as to maintain a minimum steam pressure of two pounds. The fan motor relay 200 is energized at all times provided the temperature of the air delivered from the air conditioning chamber 10 to the room or space being controlled is sufficiently high, say 75° F. This energizing circuit for the fan motor relay is as follows: line 420, wire 495, mercury switch 211 of temperature controller 205, wire 496, wire 491, wire 428, relay coil 201, and ground 422. Also, energization of the spray water valve 31 is dominated by the temperature controller 205 during the cold weather operation, the circuit being as follows: line 420, wire 495, mercury switch 211, wire 496, wire 492, mercury switch 35, wire 493, spray water valve 31, and wire 494 to ground 422. During this cold weather operation the face dampers 22 and mixing dampers 23 and the heating coil valve 88 are all controlled as hereinbefore set out.

From the foregoing it will be evident that the system of the present invention is completely automatic and serves to supply heating or cooling as needed, and particularly according to changes in outdoor temperature. It is particularly to be noted that the change-over temperature controller 181 operates on a relatively wide differential, herein set out as 5° F., thereby preventing the changing over from heating to cooling upon minor outdoor temperature changes. Under some conditions it may be desirable to adjust the change-over temperature controller 181 to operate on a still wider differential.

The system of the present invention further provides means by which the flow of steam either to the heating means or cooling means is selectively controlled in accordance with the demand for heating or cooling. The invention also includes many other features of novelty, many of which could be modified or rearranged without departing from the invention, and we therefore intend to be limited only by the scope of the appended claims.

We claim:

1. A system of the class described, comprising, in combination, circulating means for circulating outdoor air to a space the temperature of which it is desired to control, damper means associated with the circulating means and operative to vary the volume of outdoor air supplied to said space, means including a thermostat responsive to the outdoor air temperature in control of said damper means and operative to permit a maximum volume of outdoor air to be supplied to said space when the outdoor temperature is at a desired normal and to reduce the volume of outdoor air supplied to the space to a predetermined minimum if the outdoor temperature rises to a predetermined high value, and means including a thermostat responsive to the space temperature additionally controlling said damper means and operative to discontinue completely the supplying of outdoor air to the space if the space temperature rises above a predetermined high value.

2. A system of the class described, comprising in combination, circulating means for circulating outdoor air to a space the temperature of which it is desired to control, damper means associated with the circulating means and operative to vary the volume of outdoor air supplied to said space, means including a thermostat responsive to the outdoor air temperature in control of said damper means and operative to permit a maximum volume of outdoor air to be supplied to said space when the outdoor temperature is at a desired normal and to reduce the volume of outdoor air supplied to the space to a predetermined minimum if the outdoor temperature rises to a predetermined high value, cooling means for cooling the space, and means including a thermostat responsive to the space temperature which operates the cooling means if the space temperature rises above a predetermined value and which operates said damper means to discontinue completely the supplying of outdoor air to said space if the space temperature rises to a still higher value.

3. In combination, damper means in control of the supply of outdoor air to a space to be controlled, means including an outdoor temperature responsive thermostat associated with the damper means for operating the same to permit the supplying of a maximum volume of outdoor air to said space when the outdoor temperature is at a desired normal value and for gradually reducing the supply of outdoor air as the outdoor temperature rises until the supply of outdoor air reaches a predetermined minimum which is then maintained upon further increase in the outdoor temperature, and means including a thermostat responsive to indoor temperature for operating said damper means to discontinue the supply of outdoor air to said space when the space temperature rises to some predetermined high value.

4. In combination, damper means in control of the supply of outdoor air to a space to be controlled, means including an outdoor temperature responsive thermostat associated with the damper means for operating the same to permit the supplying of a maximum volume of outdoor air to said space when the outdoor temperature is at a desired normal value and for gradually reducing the supply of outdoor air as the outdoor temperature rises until the supply of outdoor air reaches a predetermined minimum which is then maintained upon further increase in the outdoor temperature, cooling means for cooling the space, and means including a thermostat responsive to the space temperature for operating the cooling means when the space temperature rises to a given value and for operating the damper means to discontinue completely the supply of outdoor air if the space temperature rises to a still higher value.

5. In combination, damper means in control of the flow of outdoor air to a space to be controlled, means for cooling the space, means for heating the space, space temperature responsive means which operates the heating means when the space temperature falls to one value and which operates the cooling means when the space temperature rises to a higher value, and means responsive to outdoor temperature operative selectively to place said space temperature responsive means in control of the heating or cooling means and to operate said damper means to permit a maximum supply of outdoor air to the space when the outdoor temperature is at some selected intermediate value and to reduce the supply of outdoor air to the space if the outdoor temperature rises above or falls below said selected value.

6. In combination, damper means in control of the flow of outdoor air to a space to be controlled, means for cooling the space, means for heating the space, space temperature responsive means which operates the heating means when the space temperature falls to one value and operates the cooling means when the space temperature rises to a higher value, means including an outdoor temperature responsive thermostat arranged selectively to permit the space temperature responsive means to operate the heating or cooling means when the outdoor temperature falls or rises to predetermined values, and means including a second outdoor temperature responsive thermostat for operating said damper means to provide a maximum supply of outdoor air to said space when the outdoor temperature is at some selected intermediate value and for gradually reducing the supply of outdoor air as the outdoor temperature rises above or falls below said selected value.

7. In combination, a boiler, a heating coil connected thereto for heating a space, a heating valve controlling the flow of fluid from the boiler to the heating coil, steam operated cooling means for cooling the space, a cooling valve in control of the flow of steam from the boiler to the cooling means, a steam pressure responsive device operative to open the cooling valve when there is a predetermined steam pressure in the boiler, means including space temperature responsive mechanism for operating said boiler to produce sufficient steam pressure to cause opening of the cooling valve on a demand for cooling and for operating the boiler and opening the heating valve when heating is necessary, and means including an outdoor temperature responsive thermostat for selectively permitting such control of said valves by said last-named means.

8. In combination, an air conditioning unit including a return inlet, an outdoor inlet and an outlet, mixing damper means for controlling the proportions of return air and outdoor air taken into said conditioner, means responsive to outdoor temperature controlling the mixing damper means to provide for the taking into said conditioner of a maximum amount of outdoor air when the outdoor air temperature is at a desired normal value and for reducing the amount of outdoor air taken into said conditioner to a minimum when the outdoor temperature rises to some maximum value, cooling means for cooling the air passing through the conditioner, and thermostatic means responsive to the temperature of the space to be controlled for placing said cooling means in operation when the space temperature rises to one value and for operating the mixing damper means to prevent the taking in of any air to the conditioner if the outdoor temperature is at said maximum value and the space temperature rises to a second value.

9. In combination, a conditioner including an outdoor air inlet and an outlet communicating with a space to be controlled, damper means in control of the outdoor air inlet, outdoor temperature responsive means controlling said damper means to permit a maximum flow of outdoor air to said conditioner when the outdoor temperature is moderate, gradually to decrease the supply of outdoor air to a predetermined minimum as the outdoor temperature rises to a predetermined high value and to maintain said minimum supply if the outdoor temperature rises till higher, a cooling coil in said conditioner for cooling the air passing therethrough, steam operated cooling means operative to supply cooling fluid to the cooling coil, a boiler for providing steam for the cooling means, and space temperature responsive means operative to place said boiler in operation when the space temperature rises to a first value and to operate the damper means to interrupt completely the flow of outdoor air to the conditioner if the space temperature rises to a second higher value.

10. In combination, an air conditioner including an outdoor air inlet and an outlet which communicates with a space to be cooled, damper means in control of the flow of outdoor air to said conditioner, means including a temperature responsive thermostat which operates the damper means to provide a maximum flow of outdoor air through the conditioner when the outdoor temperature is moderate and which gradually reduces the flow of outdoor air as the outdoor temperature increases, a cooling coil in the conditioner for cooling the air passing therethrough, a dehumidifying coil in the conditioner for dehumidifying the air passing therethrough, a cooling coil valve, a dehumidifying coil valve, means including a space temperature responsive thermostat operative to open the cooling coil valve on a demand for cooling, means including a space relative humidity responsive device operative to open the dehumidifying valve if the space relative humidity becomes excessive, and a steam operated cooling unit for supplying chilled water to the cooling and dehumidifying coils.

11. In combination, a temperature changer, means for passing air over the temperature changer, damper means for varying the volume of air passing over the temperature changer, motor means, means including a space temperature responsive thermostat operative to cause positioning of the motor means in a plurality of positions in response to space temperature changes, connections between said motor means and damper means by which said damper means is variably positioned to proportion the flow of air over the temperature changer, electrical means in control of the temperature changer, a switch in control of the electrical means, connections between the switch and motor means arranged to operate the switch when the motor means is in only one of its extreme positions, and means for operating said electrical means independently of said connections.

12. In combination, a temperature changer, means for passing air over the temperature changer, damper means for varying the volume of air passing over the temperature changer, motor means, means including a space temperature responsive thermostat operative to cause positioning of the motor means in a plurality of positions in response to space temperature changes, connections between said motor means and damper means by which said damper means is variably positioned to proportion the flow of air over the temperature changer, valve means in control of the temperature changer, a controller in control of the valve means, connections between the controller and motor means arranged to operate the controller when the motor means is in only one of its extreme positions, and outside temperature responsive means for closing said valve independently of said connections.

13. In an air conditioning system, in combination, a conditioning chamber, duct means connecting said conditioning chamber with a space to be conditioned, means for forcing air through said conditioning chamber and duct means, outside temperature responsive means for operating said air forcing means when outdoor temperature is above a predetermined value, and means responsive to a condition of the inside air for operating said air forcing means independently of said outside temperature responsive means.

14. A system of the class described, comprising, in combination, circulating means for circulating outdoor air to a space the conditions of which it is desired to control, damper means associated with the circulating means and operative to vary the volume of outdoor air suplied to said space, means including a thermostat influenced by the temperature of the outdoor air in control of said damper means and operative to permit a maximum volume of outdoor air to be supplied to said space when the outdoor temperature is at a desired normal and to reduce the volume of outdoor air supplied to the space to a predetermined minimum if the outdoor temperature varies to a predetermined value, and means including a thermostat responsive to space temperature additionally controlling said damper means and operative to further reduce the supplying of outdoor air to the space if the space temperature varies in the same direction from a predetermined value.

15. A system of the class described, comprising, in combination, circulating means for circulating outdoor air to a space the condition of which it is desired to control, air conditioning means for maintaining desired conditions within said space, damper means associated with the circulating means and operative to vary the volume of outdoor air supplied to said space, means including a thermostat influenced by the temperature of the outdoor air in control of said damper means and operative to permit a maximum volume of outdoor air to be supplied to said space when the outdoor temperature is at a desired normal and to reduce the volume of outdoor air suppied to the space to a predetermined minimum if the outdoor temperature varies to a predetermined value, and means including a device responsive to a condition indicative of the load on said air conditioning means for additionally controlling said damper means, said device being arranged to further reduce the supplying of outdoor air to the space when the load on said air conditioning means becomes excessive.

LEO B. MILLER.
HENRY F. DEVER.